United States Patent [19]

Kunkle et al.

[11] Patent Number: 4,738,938
[45] Date of Patent: Apr. 19, 1988

[54] MELTING AND VACUUM REFINING OF GLASS OR THE LIKE AND COMPOSITION OF SHEET

[75] Inventors: Gerald E. Kunkle, New Kensington, Pa.; Wright M. Welton, Paw Paw; Ronald L. Schwenninger, Ridgeley, both of W. Va.

[73] Assignee: PPG Industries, Inc., Pittsburgh, Pa.

[21] Appl. No.: 894,143

[22] Filed: Aug. 7, 1986

Related U.S. Application Data

[63] Continuation-in-part of Ser. No. 815,494, Jan. 2, 1986, abandoned.

[51] Int. Cl.[4] .................. C03B 5/225; C03C 3/04
[52] U.S. Cl. .................... 501/72; 65/129; 65/135; 65/136; 65/130; 65/335; 65/347; 501/70
[58] Field of Search .............. 65/129, 136, 134, 135, 65/335, 347, 130; 501/70, 72

[56] References Cited

U.S. PATENT DOCUMENTS

| 805,139 | 11/1905 | Hitchcock . | |
|---|---|---|---|
| 1,564,235 | 12/1925 | Harrington . | |
| 1,598,308 | 8/1926 | Pike . | |
| 2,465,283 | 3/1949 | Schlehr | 65/335 X |
| 2,781,411 | 2/1957 | Geffcken et al. . | |
| 2,877,280 | 3/1959 | Eden | 65/136 |
| 3,338,694 | 8/1967 | Davy | 65/32 |
| 3,429,684 | 5/1967 | Plumat | 65/335 |
| 3,442,622 | 5/1969 | Monnier et al. | 23/223.5 |
| 3,499,743 | 3/1970 | Fanica et al. | 65/335 X |
| 3,519,412 | 7/1970 | Olink | 65/337 |
| 3,652,245 | 3/1972 | Jung | 65/157 |
| 3,674,904 | 7/1972 | Jung | 65/347 |
| 3,689,242 | 9/1972 | Platakis et al. | 65/32 |
| 3,754,886 | 8/1973 | Richards et al. | 65/134 |
| 3,771,986 | 11/1973 | Stultz et al. | 65/134 |
| 3,775,081 | 11/1973 | Williams et al. | 65/136 X |
| 3,853,530 | 12/1974 | Rau | 65/18 |
| 3,925,052 | 12/1975 | Hummel | 501/70 X |
| 4,072,489 | 2/1978 | Loxley et al. | 65/18 |
| 4,083,711 | 4/1978 | Jensen | 65/346 |
| 4,110,098 | 8/1978 | Mattmuller | 65/141 |
| 4,178,986 | 12/1979 | Smashey | 164/251 |
| 4,195,982 | 4/1980 | Coucoulas et al. | 65/134 |
| 4,310,342 | 1/1982 | Richards | 65/27 |
| 4,381,934 | 5/1983 | Kunkle et al. | 65/135 |
| 4,492,594 | 1/1985 | Curley | 65/335 X |
| 4,519,814 | 5/1985 | Demarest, Jr. | 65/27 |
| 4,529,428 | 7/1985 | Groetzinger | 65/27 |
| 4,854,919 | 12/1974 | Pirooz | 65/32 |

FOREIGN PATENT DOCUMENTS

| 0035129 | 7/1982 | Japan | 65/134 |
|---|---|---|---|
| 818958 | 8/1959 | United Kingdom | 65/134 |
| 278052 | 12/1970 | U.S.S.R. | 65/347 |

Primary Examiner—Arthur Kellogg
Attorney, Agent, or Firm—Dennis G. Millman

[57] ABSTRACT

Method and apparatus are provided for refining glassy material or the like by vacuum. The material is first melted and then introduced into a vacuum chamber, preferably into space above liquid held in the chamber. Other aspects involve a two-step melting process preparatory to the vacuum refining, in which the material is initially liquefied in one stage and dissolution of particles is substantially completed in a second stage. The molten material is preferably foamed immediately upon entry into the vacuum chamber.

54 Claims, 1 Drawing Sheet

U.S. Patent          Apr. 19, 1988          4,738,938
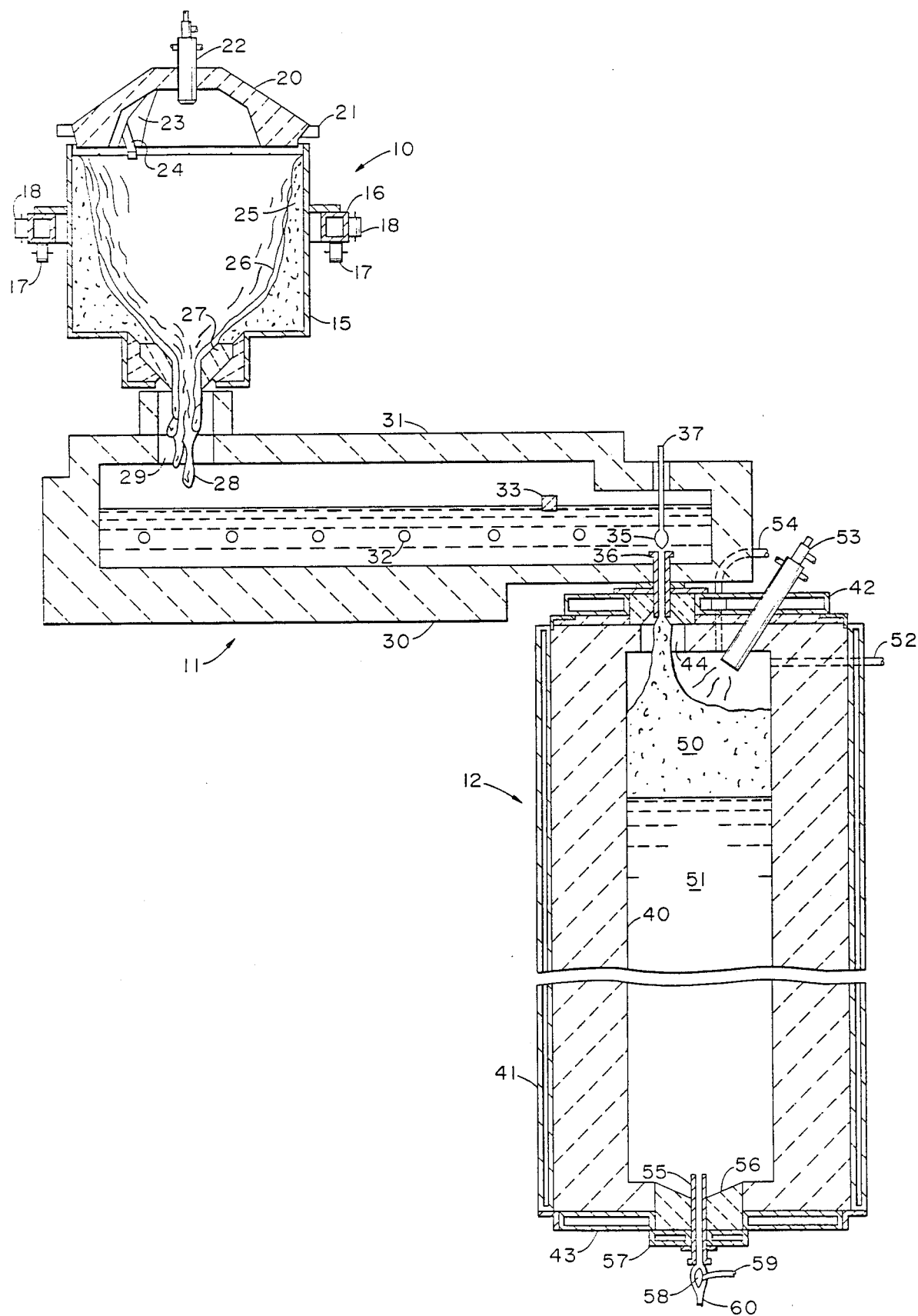

MELTING AND VACUUM REFINING OF GLASS OR THE LIKE AND COMPOSITION OF SHEET

RELATED APPLICATION

This is a continuation-in-part of U.S. patent application Ser. No. 815,494 filed Jan. 2, 1986, now abandoned by Gerald E. Kunkle, Wright M. Welton, and Ronald L. Schwenninger.

BACKGROUND OF THE INVENTION

The present invention relates to the use of subatmospheric pressure to expedite refining of molten glass or the like. More particularly, the invention relates to a practical arrangement for a continuous commercial scale utilization of such a refining technique.

In the melting of glass, substantial quantities of gas are produced as a result of decomposition of batch materials. Other gases are physically entrained by the batch materials or are introduced into the melting glass from combustion heat sources. Most of the gas escapes during the initial phase of melting, but some becomes entrapped in the melt. Some of the trapped gas dissolves in the glass, but other portions form discrete gaseous inclusions known as bubbles or "seeds" which would be objectionable if permitted to remain in unduly high concentrations in the product glass. The gas inclusions will rise to the surface and escape from the melt if given sufficient time in the stage of a glassmaking operation known as "refining" or "fining." High temperatures are conventionally provided in the refining zone to expedite the rise and escape of the gaseous inclusions by reducing the viscosity of the melt and by enlarging the bubble diameters. The energy required for the high temperatures employed in the refining stage and the large melting vessel required to provide sufficient residence time for the gaseous inclusions to escape from the melt are major expenses of a glassmaking operation. Accordingly, it would be desirable to improve the refining process to reduce these costs.

It has been known that reduced pressure could assist the refining process by reducing the partial pressure over the melt of the dissolved gases. Also, reducing the pressure increases the volume of bubbles within the melt so as to speed their rise to the surface. The impracticality of providing a gas-tight vessel on the scale of a conventional refining chamber so as to draw a vacuum therein has limited the use of vacuum refining to relatively small scale batch operations such as disclosed in U.S. Pat. Nos. 1,564,235; 2,781,411; 2,877,280; 3,338,694; and 3,442,622.

Continuous vacuum refining processes have been proposed but have not found acceptance for large scale, continuous manufacture of glass due to various drawbacks. In the continuous vacuum refining arrangements shown in U.S. Pat. Nos. 805,139; 1,598,308; and 3,519,412 a major disadvantage is the requirement for relatively narrow vertical passageways leading into and out of the vacuum zone necessitated by the pressure difference. These passageways complicate the construction of such a vessel, particularly in view of the requirement for gas-tight walls, increase the exposure of the throughput to contaminating refractory contact, and impose a significant viscous drag to the throughput flow. It may be noted that a substantial height of glass is required to balance even a moderate degree of vacuum. Varying the output of such a system is also a problem, particularly in view of the viscous drag factor. Flexibility in the output rate is important in a continuous commercial operation due to changes in the product being made (thickness, width) and economic factors that affect the rate of production desired. In each of the three patents noted above, the driving force for increasing the rate of flow through the passages of the vacuum section can be provided only by increasing the depth of the melt upstream of the vacuum section relative to the depth of the melt downstream from the vacuum section. The magnitude of this level difference is exacerbated by the viscous drag inherent in these systems. Because accelerated erosion of the side walls occurs at the elevation of the surface of the melt, significantly changing the level aggravates the erosion which, in turn, deteriorates the quality of the product glass.

A simpler structure is shown in U.S. Pat. No. 3,429,684, wherein batch materials are fed through a vacuum lock and melted at the top of a vertically elongated vacuum chamber. Varying throughput in that arrangement appears to require changing the amount of vacuum imposed in the chamber, which would disadvantageously alter the degree of refining achieved. Melting raw materials within the vacuum chamber is another disadvantage of that arrangement for several reasons. First, large volumes of foam would be created by carrying out the initial decomposition of the raw materials under vacuum, which would require a vessel large enough to contain the foam. Second, there is a danger that raw materials may follow a short circulation path to the output stream, thus avoiding adequate melting and refining. Third, carrying out the initial stages of melting and heating the melt to a refining temperature within the vacuum vessel require large amounts of heat to be supplied to the melt within the vessel. Such a major heat input to the vessel inherently induces convection currents within the melt that increase erosion of the walls, which leads to contamination of the refined product stream. Fourth, carbon dioxide released from decomposing the batch carbonates would create a relatively high partial pressure of carbon dioxide within the vessel, thereby at least partially negating the ability of the reduced pressure to remove carbon dioxide from the melt.

U.S. Pat. No. 4,195,982 discloses initially melting glass under elevated pressure and then refining the glass in a separate chamber at a lower pressure. Both chambers are heated.

U.S. Pat. No. 4,110,098 discloses a process of deliberately foaming glass to aid refining. The foaming is induced by intense heat and chemical foaming agents at atmospheric pressure.

SUMMARY OF THE INVENTION

In the present invention, method and apparatus are provided by which vacuum refining may be employed in a commercial scale, continuous glassmaking process in a manner that advantageously and economically overcomes the drawbacks of the prior art. Molten glass is admitted to the vacuum refining chamber after the majority of the thermal energy required for melting has been imparted to the melt so that little or no thermal energy need be supplied to the molten material contained within the vacuum chamber. Preferably, no more heat is added at the vacuum stage than is necessary to compensate for heat loss through the vessel walls. At sufficiently high throughput rates, the vacuum chamber may be completely unheated by other than the incoming molten glass itself. In preferred embodiments of the present invention, batch materials are first liquefied at a stage specifically adapted for that step of the process, and the liquefied material is transferred to a second stage where dissolution of solid particles is essentially completed and the temperature of the material may be raised to a temperature to provide a viscosity suitable for refining. Subsequently, the molten material is passed to the vacuum chamber. As a result, a large portion of the gaseous by-products of melting are driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage and heating of the refining stage can therefore be substantially avoided, excessive convection of the melt in the refining zone can be avoided. As a result, vessel erosion is reduced and the probability of incompletely refined portions of the melt becoming mixed with more refined portions is reduced.

The assistance provided by the vacuum to the refining process enables lower temperatures to be used for refining. Lower temperatures are advantageous not only for less energy consumption, but also for the sake of reduced corrosive effect on the vessel. Glass normally refined at peak temperatures on the order of 2800° F. (1520° C.) can be refined to the same extent at temperatures no greater than about 2600° F. (1425° C.) or even 2500° F. (1370° C.) or lower, depending upon the level of vacuum employed.

It is theorized that the creation of foam in the vacuum refining chamber significantly enhances removal of gases from the melt. The thin film and large surface area presented by the foam increases exposure to the low pressure conditions and expedites transport of the gases out of the liquid phase. This contrasts to conventional refining where residence time must be provided to permit bubbles to rise to the surface and escape from the viscous melt, which entails retaining a large pool of the melt. Thus, vacuum refining of the present invention can achieve a given degree of refining in a considerably smaller space. In preferred embodiments of the invention the beneficial effects of exposing foamed melt to vacuum are enhanced by foaming the material as it enters the vacuum vessel, before it enters the body of molten material retained therein, and preferably before the entering stream penetrates into the foam layer.

Another aspect of the invention relates to advantages in throughput control in a continuous refining operation. Liquefied material is metered into the upper end of the vacuum chamber through valve means, and refined melt is passed from the lower end of the vacuum chamber through another valve arrangement. The height of liquid maintained within the vacuum chamber is at least slightly greater than the height required to counterbalance the vacuum so that the melt can flow by gravity from the outlet. Also, by providing a liquid height greater than the minimum required for draining, the throughput rate can be controlled by means of the valves without altering the vacuum pressure in the chamber and without changing the liquid level within the chamber. Conversely, a range of vacuum pressures can be employed without changing the throughput rate. Aside from the valves, the system is provided with relatively low resistance to flow of the molten material therethrough.

Not only is the throughput variable in a given installation of the present invention, but the effectiveness is relatively independent of the scale of the system, unlike conventional tank-type recirculating refiners that do not operate effectively for low volume applications. Therefore, the present invention can be applied effectively to a wide range of glassmaking operations.

The preferred configuration for the vacuum refining chamber is a vertically elongated vessel, most conveniently in the shape of an upright cylinder. Liquified material is introduced into the headspace above the molten material held in the vessel. Upon encountering the reduced pressure in the headspace, at least a substantial portion of the material foams due to evolvement of gases dissolved in the material and due to enlargement of bubbles and seeds present in the material. Creating a foam greatly increases the surface area exposed to the reduced pressure, thus aiding the removal of gaseous species from the liquid phase. Producing the foam above the molten pool held in the vessel rather than from the molten pool is advantageous for collapsing foam and aiding the escape of gases. It has also been found that depositing newly generated foam onto a foam layer expedites collapse of the foam. Another advantage of the vertically elongated geometry is that stratification occurs due to the less dense foam or bubble containing material remaining at the upper end, so that the overall mass transport is away from the foam region, thereby rendering it unlikely that any of the unrefined material would become included in the product stream. Stripping gases from the melt at reduced pressure reduces the concentration of gases dissolved in the melt to below their saturation points at atmospheric pressure. As the molten material progresses downwardly toward an outlet at the bottom, the increasing pressure due to the depth of the melt in the vessel induces any residual gases to remain in solution and decreases the volume of any small seeds that may remain. Dissolution of gases may also be aided by permitting the temperature to fall as the material progresses toward the outlet. Moreover, the low concentration of gases remaining after vacuum refining reduces the probability of nucleation of bubbles in subsequent stages of the glassmaking process, as is frequently a problem with conventional refining.

In commercial melting of glass, especially soda-lime-silica glass, sodium sulfate or calcium sulfate or other sources of sulfur are usually included in the batch materials to aid the melting and refining process. Antimony, arsenic, and fluorine are also known as refining aids. The presence of refining aids such as sulfur in the melt has been found to be a problem when refining with vacuum because of the large volumes of foam induced and because of attack on the ceramic refractory walls of a vacuum refining vessel. But heretofore, effective melting and refining of glass have been difficult to achieve without the refining aids. It is yet another advantageous aspect of the present invention that glass can be melted and refined to a high standard of quality with the use of little or no chemical refining aid. This is feasible in the present invention because the melting and refining steps are carried out in discrete stages, whereby each stage may be carried out by a process adapted to minimize or avoid the use of chemical refining aids. It is generally believed that chemical refining aids serve to expedite the accumulation and rise of bubbles from within a molten pool, but such a mechanism is believed to play no more than a minor role in the refining process of the present invention. Therefore, no significant effect on quality results from eliminating or substantially reducing the amount of refining aids used. Elimination or reduction of the refining aids is also desirable for the sake of reducing undesirable emissions into the environment. In the float process of manufacturing flat glass, reducing or eliminating sulfur from the glass is additionally advantageous for the sake of avoiding defects caused by the formation and volatilization of tin sulfide in the float forming chamber that leads to condensation and drippage onto the top surface of the glass. Sulfur in combination with iron has a coloration effect on glass, so the avoidance of sulfur for refining permits more precise control of the color of some glass.

Particularly advantageous is the use of the discrete ablating liquefaction process jisclosed in U.S. Pat. No. 4,381,934 for rendering the pulverulent batch materials to the initially flowable stage prior to being refined by the discrete process stage of the present invention. However, other liquefying techniques could be employed.

THE DRAWING

The FIGURE is a vertical cross-section through three stages of a melting operation including a liquefaction stage, dissolving stage and a vacuum refining stage in accordance with a preferred embodiment of the present invention.

DETAILED DESCRIPTION

The detailed description will be set forth in conjunction with a method and apparatus specifically adapted for melting glass, but it should be understood that the invention is applicable to the processing of other materials as well.

Referring to the FIGURE, the overall melting process of the present invention preferably consists of three stages: a liquefaction stage 10, a dissolving stage 11 and a vacuum refining stage 12. Various arrangements could be employed to initiate the melting in the liquefaction stage 10, but a highly effective arrangement for isolating this stage of the process and carrying it out economically is that disclosed in U.S. Pat. No. 4,381,934 which is hereby incorporated by reference for details of the preferred liquefaction stage embodiment. The basic structure of the liquefaction vessel is a drum 15 which may be fabricated of steel and has a generally cylindrical sidewall portion, a generally open top, and a bottom portion that is closed except for a drain outlet. The drum 15 is mounted for rotation about a substantially vertical axis, for example, by means of an encircling support ring 16 rotatably carried on a plurality of support wheels 17 and held in place by a plurality of aligning wheels 18. A substantially enclosed cavity is formed within the drum 15 by means of a lid structure 20 which is provided with stationary support by way of a peripheral frame 21, for example. The lid 20 may take a variety of forms as may be known to those of skill in the refractory furnace construction art. The preferred arrangement depicted in the FIGURE is an upwardly domed, sprung arch construction fabricated from a plurality of refractory blocks. It should be understood that monolithic or flat suspended designs could be employed for the lid.

Heat for liquefying the batch material may be provided by one or more burners 22 extending through the lid 20. Preferably, a plurality of burners are arranged around the perimeter of the lid so as to direct their flames toward a wide area of the material within the drum. The burners are preferably water cooled to protect them from the harsh environment within the vessel. Exhaust gases may escape from the interior of the liquefaction vessel through an opening 23 in the lid. Advantageously the waste heat in the exhaust gases may be used to preheat the batch material in a preheating stage (not shown) such as that disclosed in U.S. Pat. No. 4,519,814.

Batch materials, preferably in a pulverulent state, may be fed into the cavity of the liquefying vessel by means of a chute 24, which in the embodiment depicted extends through the exhaust opening 23. Details of the feed chute arrangement may be seen in U.S. Pat. No. 4,529,428. The batch chute 24 terminates closely adjacent to the sidewalls of the drum 10, whereby batch material is deposited onto the inner sidewall portions of the drum. A layer 25 of the batch material is retained on the interior walls of the drum 10 aided by the rotation of the drum and serves as an insulating lining. As batch material on the surface of the lining 25 is exposed to the heat within the cavity, it forms a liquefied layer 26 that flows down the sloped lining to a central drain opening at the bottom of the vessel. The outlet may be fitted with a ceramic refractory bushing 27. A stream of liquefied material 28 falls freely from the liquefaction vessel through an opening 29 leading to the second stage 11. The second stage may be termed the dissolving vessel because one of its functions is to complete the dissolution of any unmelted grains of batch material remaining in the liquefied stream 28 leaving the liquefaction vessel 10. The liquefied material at that point is typically only partially melted, including unmelted sand grains and a substantial gaseous phase. In a typical soda-lime-silica melting process using carbonate batch materials and sulfates as a refining aid, the gaseous phase is chiefly comprised of carbon oxides and sulfur oxides. Nitrogen may also be present from entrapped air.

The dissolving vessel 11 serves the function of completing the dissolution of unmelted particles in the liquefied material coming from the first stage by providing residence time at a location isolated from the downstream refining stage. Soda-lime-silica glass batch typically liquefies at a temperature of about 2200° F. (1200° C.) and enters the dissolving vessel 11 at a temperature of about 2200° F. (1200° C.) to about 2400° F. (1320° C.), at which temperature residual unmelted particles usually become dissolved when provided with sufficient residence time. The dissolving vessel 11 shown is in the form of a horizontally elongated refractory basin 30 with a refractory roof 31, with the inlet and outlet at opposite ends thereof so as to assure adequate residence time. The depth of molten material in the dissolving vessel may be relatively shallow in order to discourage recirculation of material.

Although the addition of substantial thermal energy is not necessary to perform the dissolving step, heating can expedite the process and thus reduce the size of the dissolving vessel 11. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, and optionally no more than 2600° F. (1430° C.) prior to refining. When the lower range of pressures disclosed herein are used, the temperature in the refining vessel need be no higher than 2500° F. (1370° C.). Peak temperature reductions on this order result in significantly longer life for refractory vessels as well as energy savings. The liquefied material entering the dissolving vessel need be heated only moderately to prepare the molten material for refining. Combustion heat sources could be used in the dissolving stage 11, but it has been found that this stage lends itself well to electric heating, whereby a plurality of electrodes 32 may be provided as shown in the FIGURE extending horizontally through the sidewalls. Heat is generated by the resistance of the melt itself to electric current passing between electrodes in the technique conventionally employed to electrically melt glass. The electrodes 32 may be carbon or molybdenum of a type well known to those of skill in the art. A skimming member 33 may be provided in the dissolving vessel to prevent any floating material from approaching the outlet end.

A valve controlling the flow of material from the dissolving stage 11 to the refining stage 12 is comprised of a plunger 35 axially aligned with a drain tube 36. The shaft 37 of the plunger extends through the roof 31 of the dissolving vessel so as to permit control over the gap of the plunger 35 and the tube 36 to thereby modulate the rate of flow of material into the refining stage. Although the valve arrangement is preferred, other means could be provided to control the flow rate of molten material to the refining stage as are known in the art. An example would be the use of heating and/or cooling means associated with the drain tube so as to modulate the viscosity, and thus the flow rate, of the molten material passing therethrough.

The refining stage 12 preferably consists of a vertically upright vessel that may be generally cylindrical in configuration having an interior ceramic refractory lining 40 shrouded in a gas-tight water-cooled casing. The refractory may be an alumina-zirconia-silica type well known in the art. The casing may include a double walled, cylindrical sidewall member 41 having an annular water passageway therebetween and circular end coolers 42 and 43. A layer of insulation (not shown) may be provided between the refractory 40 and the sidewall 41. The valve tube 36 may be fabricated of a refractory metal such as platinum and is sealingly fitted into an orifice 44 at the upper end of the refining vessel.

As the molten material passes through the tube 36 and encounters the reduced pressure within the refining vessel, gases included in the melt expand in volume, creating a foam layer 50 resting on a body of liquid 51. As foam collapses it is incorporated into the liquid body 51. Subatmospheric pressure may be established within the refining vessel through a vacuum conduit 52 extending through the upper portion of the vessel. As used herein, "foaming" can be considered to be characterized by at least a doubling of the volume of the molten material. If the material is fully foamed, the volume increase is usually much greater than double. Distributing the molten material as thin membranes of a foam greatly increases the surface area exposed to the reduced pressure. Therefore, maximizing the foaming effect is preferred. It is also preferred that the foam be exposed to the lowest pressures in the system, which are encountered at the top of the vessel in the headspace above the liquid, and therefore exposure is improved by permitting newly introduced, foamed material to fall through the headspace onto the top of the foam layer. Also, it is more consistent with the mass transfer in the vessel to deposit freshly foamed material onto the top of the foam layer rather than generating foam from the surface of the liquid pool beneath the foam layer. Depending upon the pressure in the vacuum space and the volume flow rate of the molten material entering the refining vessel, the entering stream may either penetrate through the foam layer as a generally coherent liquid stream, whereby foaming occurs from the surface of the pool 51, or the stream may foam immediately upon encountering the reduced pressure. Either mode can be used, but for the reasons stated above, the latter mode has been found to be more effective.

The heat content of the molten throughput material entering the refining vessel 12 can be sufficient to maintain suitable temperatures within the vessel, but at lower throughput rates energy losses through the walls may exceed the rate at which energy is being transported into the vessel by the molten material. In such a case, it may be desirable to provide heating within the refining vessel for the sake of avoiding undue temperature reduction. The amount of heating could be relatively minor since its purpose would be merely to offset heat losses through the walls, and may be carried out by conventional electric heating arrangements whereby electrodes extend radially through the side wall and electric current is passed between the electrodes through the glass.

Regardless of the throughput rate, the space above the molten body 51 in the vessel 12 can tend to be cooler than desired because of the absence of the molten mass and because radiation from the molten mass is insulated by the foam layer 50. As a result, the upper portion of the foam layer can become cooler, which in turn increases the viscosity of the foam and slows the rate at which gases are expelled. In that case, it has been found advantageous to provide means for heating the headspace above the liquid and foam. For this purpose, it has been found feasible to provide a burner 53 and to sustain combustion within the vacuum space, which is the subject matter of a co-pending, commonly assigned U.S. patent application Ser. No. 895,647, filed on Aug. 12, 1986 now U.S. Pat. No. 4,704,153.

A conduit 54 may be provided at the upper end of the vacuum vessel whereby a small amount of water may be sprayed onto the foam periodically. The water spray has been found to assist the foam to collapse, and is the subject matter of another co-pending, commonly assigned U.S. patent application Ser. No. 882,647 filed on July 7, 1986.

In the embodiment depicted, refined molten material is drained from the bottom of the refining vessel 12 by way of a drain tube 55 of a refractory metal such as platinum. It would also be feasible to locate the drain in a side wall of the vessel in the region of the bottom. The drain tube 55 preferably extends above the surface of the refractory bottom section 56 within which it is mounted to prevent any debris from entering the output stream. The bottom section 56 may be provided with reduced thickness adjacent to the tube 55 so as to reduce the insulating effect on the tube, thereby permitting the temperature of the tube to be elevated to prevent freezing of material within the tube. Leakage around the tube is prevented by a water cooler 57 under the bottom section 56. The flow rate of molten material from the drain tube 55 is controlled by a conical throttle member 58 carried at the end of a stem 59. The stem 59 is associated with mechanical means (not shown) to adjust the elevation of the throttle member 58 and thus adjust the gap between the throttle member and the tube 55 so as to control the flow rate therefrom. A molten stream 60 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

Although various shapes could be employed, the refining vessel 12 is preferably cylindrical in configuration. The cylindrical shape is advantageous for the sake of constructing a gas-tight vessel. The ratio of interior surface contact area to volume is also minimized with a circular cross-section. Compared to a conventional open hearth type recirculating refiner, only a fraction of the refractory contact area is entailed by the cylindrical vacuum refiner of the present invention.

The height of molten material 51 retained in the refiner 12 is dictated by the level of vacuum imposed in the chamber. The pressure head due to the height of the liquid must be sufficient to establish a pressure equal to or greater than atmospheric at the outlet to permit the material to drain freely from the vessel. The height will depend upon the specific gravity of the molten material, which for soda-lime-silica glass at the temperatures in the refining stage is about 2.3. A height in excess of the minimum required to offset the vacuum may be desired to account for fluctuations in atmospheric pressure, to permit variation of the vacuum, and to assure steady flow through the outlet. Conditions could be maintained so that flow through the outlet is regulated without bottom valve means. But in the preferred embodiments of the present invention, a substantial excess height is provided so that the outlet flow rate is not determined by the vacuum pressure, but rather by mechanical valve means, i.e., the throttle member 58. Such an arrangement permits the throughput rate and the vacuum pressure to be varied independently of each other. Alternatively, the pressure at the outlet could be below atmospheric if the outlet is provided with pump means to overcome the pressure differential. An example of a pump that is intended for use with molten glass is disclosed in U.S. Pat. No. 4,083,711, the disclosure of which is hereby incorporated by reference.

The pressure equalization function of the vessel 12 is independent of its width, and therefore, the vessel could theoretically be in the form of a narrow, vertical pipe. However, a relatively wide vessel is preferred for the sake of residence time to permit reabsorption of gases, for reduced flow resistance, and for distribution of heat into the lower portion of the vessel without requiring auxiliary heating sources. For these purposes, a height to width ratio of no more than 5 to 1 is preferred.

The benefits of vacuum on the refining process are attained by degrees; the lower the pressure, the greater the benefit. Small reductions in pressure below atmospheric may yield measurable improvements, but to economically justify the vacuum chamber, the use of substantially reduced pressures are preferred. Thus, a pressure of no more than one-half atmosphere is preferred for the appreciable refining improvements imparted to soda-lime-silica flat glass. Significantly greater removal of gases is achieved at pressures of one-third atmosphere or less. A standard clear soda-lime-silica flat glass composition was refined at an absolute pressure of 100 torr and yielded a product having one seed per 100 cubic centimeters, which is a quality level acceptable for many glass products. A refining pressure below 100 torr, for example 20 to 50 torr, would be preferred to yield commercial float glass quality of about one seed per 1,000–10,000 cubic centimeters. Seeds less than 0.01 millimeter in diameter are considered imperceptible and are not included in the seed counts.

Melting and fining aids such as sulfur or fluorine compounds are conventionally included in glass batches, but produce a substantial portion of the undesirable emissions in exhaust gas from glass melting furnaces. Their elimination would be desirable, but to attain the highest levels of quality, particularly for flat glass standards, use of the aids has been considered necessary. Furthermore, sulfur sources (e.g., sodium sulfate, calcium sulfate) have been found to cause excessive foaming under vacuum. Typically, flat glass batch includes sodium sulfate in the amounts of about 5 to 15 parts by weight per 1000 parts by weight of the silica source material (sand), with about 10 parts by weight considered desirable to assure adequate refining. When operating in accordance with the present invention, however, it has been found preferable to restrict the sodium sulfate to two parts by weight to maintain a manageable level of foaming, and yet it has been found that refining is not detrimentally affected. Most preferably, the sodium sulfate is utilized at no more than one part per 1000 parts sand, with one-half part being a particularly advantageous example. These weight ratios have been given for sodium sulfate, but it should be apparent that they can be converted to other sulfur sources by molecular weight ratios. Complete elimination of refining aids is feasible with the present invention, although trace amounts of sulfur are typically present in other batch materials so that small amounts of sulfur may be present even if no deliberate inclusion of sulfur is made in the batch.

No significant detrimental effect on physical properties of glass subjected to the vacuum refining method of the present invention has been found. However, the vacuum treatment does have some detectable effect on the composition of the glass, such that glass produced by this method can be distinguished from the same type of glass produced by a conventional commercial process. The vacuum treatment has been found to reduce the concentration of volatile gaseous components, particularly the refining aids such as sulfur, to levels lower than the equilibrium levels attained with conventional processes. Glass produced in small pot melts or the like is sometimes reported as having very little or no residual refining aid content. This is because non-continuous melting processes can provide long periods of time for refining, thereby avoiding the need for chemical refining aids. Also, small melts are often produced from chemically pure raw materials and from oxide raw materials that, unlike conventional carbonate mineral batch materials, do not produce substantial volumes of gaseous by-products. However, soda-lime-silica glass products that are mass-produced by continuous melting processes are characterized by significant amounts of residual refining aids. Such products would include glass sheets suitable for glazing vision openings in buildings or vehicles (e.g., float glass) and container ware (e.g., bottles). In such products, the residual sulfur content (expressed as $SO_3$) is typically on the order of 0.2% by weight and seldom less than 0.1%. Even when no deliberate addition of sulfur refining aid is made to the batch, at least 0.02% $SO_3$ is usually detected in a soda-lime-silica glass made in a conventional continuous melter. Flat glass for transparent vision glazing applications normally has more than 0.05% $SO_3$. In distinction thereto, soda-lime-silica glass can be produced continuously by the present invention at the preferred vacuum levels with less than 0.02% residual $SO_3$, even when relatively small amounts of sulfur refining aid are being included in the batch as described above, and less than 0.01% $SO_3$ when no deliberate inclusion of sulfur is being made. At the lowest pressures, with no deliberate sulfur addition, $SO_3$ contents less than 0.005% are attainable. Commercial soda-lime-silica glass that is commonly refined with sulfur compounds may be characterized as follows:

|  | Weight % |
|---|---|
| $SiO_2$ | 70-74 |
| $Na_2O$ | 12-16 |
| CaO | 8-12 |
| MgO | 0-5 |
| $Al_2O_3$ | 0-3 |
| $K_2O$ | 0-3 |
| BaO | 0-1 |
| $Fe_2O_3$ | 0-1 |

Small amounts of colorants or other refining aids may also be present. Arsenic, antimony, fluorine, and lithium compounds are sometimes used as refining aids, and residues may be detected in this type of glass. A sheet of float glass or a bottle represent common commercial embodiments of the above composition.

A sheet of glass that has been formed by the float process (i.e., floated on molten tin) is characterized by measurable amounts of tin oxide that migrated into surface portions of the glass on at least one side. Typically a piece of float glass has an $SnO_2$ concentration of at least 0.05% by weight in the first few microns below the surface that was in contact with the tin. Because the float process entails a relatively large scale continuous melting furnace of the type that conventionally employs significant amounts of sulfur-containing refining aids, float glass is characterized by minimum $SO_3$ concentrations higher than those discussed above for soda-lime-silica glass in general. Therefore, float glass refined by the present process having less than 0.08% $SO_3$ would be distinguished from conventional commercially available float glass. Most float glass falls within the following compositional ranges:

| $SiO_2$ | 72-74% by weight |
|---|---|
| $Na_2O$ | 12-14 |
| CaO | 8-10 |
| MgO | 3-5 |
| $Al_2O_3$ | 0-2 |
| $K_2O$ | 0-1 |
| $Fe_2O_3$ | 0-1 |

Colorants and traces of other substances may be present.

Although the description of the preferred embodiments and some of the advantages of the present invention are associated with continuous processes of making glass or the like, it should be evident that non-continuous refining operations could also gain at least some of the benefits of the present application.

Other variations as would be known to those of skill in the art may be resorted to within the scope of the present invention as defined by the claims that follow.

We claim:

1. A method of melting and refining glassy material or the like comprising:
   producing a melt of the material;
   feeding the molten material at a controlled rate to the upper end of a space maintained at a sufficient pressure below atmospheric to cause the entering material to foam due to expansion of gas content of the molten material;
   gathering molten material from collapsing foam in a body below the subatmospheric space; and
   withdrawing molten material from the body.

2. The method of claim 1 wherein the molten material is introduced into the subatmospheric space through a valved orifice above the level of the molten material.

3. The method of claim 1 wherein transport through the body of molten material is predominantly in a vertical direction toward the location of withdrawing.

4. The method of claim 1 wherein the subatmospheric pressure is no more than one-half of atmospheric pressure.

5. The method of claim 1 wherein the subatmospheric pressure is no more than one-third of atmospheric pressure.

6. The method of claim 1 wherein the pressure in the body of molten material at the elevation of withdrawal is at least atmospheric pressure.

7. The method of claim 6 wherein the rate of withdrawal is controlled by outlet orifice means.

8. The method of claim 1 wherein material that is newly foamed is deposited onto a mass of foam previously formed.

9. The method of claim 1 wherein the material being melted and refined is glass.

10. The method of claim 1 wherein the material being melted and refined is soda-lime-silica glass.

11. The method of claim 1 wherein the subatmospheric pressure is no more than 100 torr.

12. The method of claim 1 wherein the subatmospheric pressure is no more than 50 torr.

13. The method of claim 1 wherein the step of producing a melt of the material comprises rendering batch materials to an incompletely melted flowable state in a first chamber and passing the material to a second chamber where the melting is furthered.

14. The method of claim 13 wherein the material passing from the first chamber includes unmelted particles, and the particles are substantially dissolved in the second chamber.

15. The method of claim 13 wherein the material being melted is soda-lime-silica glass, and the material is passed from the second chamber to the subatmospheric space at a temperature no greater than 2700° F. (1450° C.).

16. The method of claim 15 wherein the material is passed from the first chamber to the second chamber at a temperature of about 2200° F. (1200° C.) to 2400° F. (1320° C.).

17. The method of claim 13 wherein the material is heated in the second chamber to a temperature suitable for refining.

18. The method of claim 13 wherein the material being melted is soda-lime-silica glass, and the batch materials are fed to the first chamber with a sulfur source as a refining aid in an amount no greater than an equivalent amount of 2 parts by weight sodium sulfate per 1000 parts by weight of silica source material.

19. The method of claim 13 wherein the step of rendering the batch materials to a flowable state comprises exposing the batch materials to heat while supported on a slope.

20. The method of claim 19 wherein the slope encircles a centrally heated cavity.

21. The method of claim 13 wherein the temperature is increased in the second chamber by electric heating.

22. The method of claim 13 wherein material flows in the second chamber from an inlet region to an outlet region along a predominantly horizontal path.

23. The method of claim 1 wherein the withdrawing of molten material from the body is carried out through an orifice of variable opening.

24. A method of melting and refining glassy material or the like comprising:

liquefying batch material;

passing the liquefied material into the upper portion of a vessel within which pressure below atmospheric is maintained, the liquid being passed through valve means to control the amount of liquid input to the vessel;

subjecting the liquefied material to reduced pressure within the vessel sufficiently to substantially refine the material; and draining refined material from a lower portion of the vessel at a selected rate to control the volume of material in the vessel.

25. The method of claim 24 wherein the pressure at the upper portion is no more than one-half of atmospheric pressure, and the pressure at the lower portion is at least atmospheric.

26. The method of claim 24 wherein the rate at which liquefied material is drained from the vessel is regulated by second valve means.

27. The method of claim 24 wherein the glassy material is soda-lime-silica glass.

28. The method of claim 24 wherein, subsequent to being liquefied and prior to passing through the valve means, the temperature of the liquefied material is raised to a temperature suitable for refining.

29. Apparatus for melting and refining glassy materials or the like, comprising:

a first vessel having means to heat batch material to a flowable condition and means to drain liquefied batch material therefrom directly upon attaining the flowable condition;

a second vessel adapted to receive the liquefied batch material from the first vessel and adapted to substantially complete dissolution of particles in the liquefied material; and a third vessel having an inlet in its upper end mounted to receive the heated material from the second vessel at an upper end, means to impart and maintain subatmospheric pressure within the third vessel, and means to drain refined material from a lower portion of the third vessel.

30. The apparatus of claim 29 wherein the third vessel is vertically elongated.

31. The apparatus of claim 30 wherein the third vessel is generally cylindrical in configuration.

32. The apparatus of claim 29 wherein the second vessel communicates with the third vessel by way of an orifice having flow control means associated therewith.

33. The apparatus of claim 29 wherein the means to drain material from the third vessel includes flow control means.

34. The apparatus of claim 29 wherein the third vessel includes a gas-tight shroud.

35. The apparatus of claim 34 wherein the shroud is provided with cooling means.

36. Apparatus for melting and refining glassy materials or the like comprising a vertically elongated vessel adapted to hold a body of molten glassy material, inlet means at an upper end of the vessel adapted to pass molten glassy material into a space above the molten body in the vessel, outlet means at a lower portion of the vessel adapted to pass molten glassy material from the vessel, and means to impart and maintain a subatmospheric pressure to the upper portion of the vessel.

37. The apparatus of claim 36 wherein the inlet means has associated with it means to control the flow rate of molten material therethrough.

38. The apparatus of claim 37 wherein the outlet means has associated therewith means to control the flow rate of molten material therethrough.

39. The apparatus of claim 36 wherein the vessel is generally cylindrical in configuration.

40. The apparatus of claim 39 wherein the vessel is provided with a gas-tight shroud including cooling means.

41. The apparatus of claim 36 wherein the height of the vessel is no more than five times its width.

42. The apparatus of claim 36 further including a source of molten glassy material connected to the inlet means.

43. A soda-lime-silica flat glass product comprising:

| | |
|---|---|
| $SiO_2$ | 70–74 percent by weight |
| $Na_2O$ | 12–16 |
| CaO | 8–12 |
| MgO | 0–5 |
| $Al_2O_3$ | 0–3 |
| $K_2O$ | 0–3 |
| BaO | 0–1 |
| $Fe_2O_3$ | 0–1 | characterized by a residue of a sulfur-containing refining aid from a trace to an amount less than 0.01 weight percent measured as $SO_3$.

44. The product of claim 43 wherein the residual sulfur is less than 0.05 percent by weight measured as $SO_3$.

45. The product of claim 43 wherein the glass has less than one gaseous inclusion per 100 cubic centimeters.

46. The product of claim 43 wherein the glass has less than one gaseous inclusion per 1,000 cubic centimeters.

47. The product of claim 43 in the form of a flat glass sheet.

48. The glass sheet of claim 47 wherein tin oxide is present in surface portions of at least one surface.

49. A sheet of transparent flat glass suitable for vision glazing consisting essentially of

| | |
|---|---|
| $SiO_2$ | 70–74 percent by weight |
| $Na_2O$ | 12–16 |
| CaO | 8–12 |

| -continued | |
|---|---|
| MgO | 0–5 |
| Al$_2$O$_3$ | 0–3 |
| K$_2$O | 0–3 |
| BaO | 0–1 |
| Fe$_2$O$_3$ | 0–1 | characterized by a residual sulfur content from a trace to no more than 0.01% by weight measured as SO$_3$.

50. The glass sheet of claim 49 wherein the SO$_3$ content is less than 0.005% by weight.

51. A sheet of float glass comprising a bulk composition of a soda-lime-silica glass and a concentration of SnO$_2$ in at least one surface portion greater than the bulk composition; characterized by a residual sulfur content, measured as SO$_3$, from a trace to less than 0.01% by weight.

52. The glass sheet of claim 51 wherein the SO$_3$ concentration is less than 0.005% by weight.

53. The glass sheet of claim 51 wherein the bulk composition consists essentially of:

| SiO$_2$ | 72–74 | percent by weight |
|---|---|---|
| Na$_2$O | 12–14 | |
| CaO | 8–10 | |
| MgO | 3–5 | |
| Al$_2$O$_3$ | 0–2 | |
| K$_2$O | 0–1 | |
| Fe$_2$O$_3$ | 0–1 | |

54. The glass sheet of claim 53 wherein a surface portion includes at least 0.5% by weight SnO$_2$.

* * * * *